US007212099B2

(12) United States Patent
Zhai

(10) Patent No.: US 7,212,099 B2
(45) Date of Patent: May 1, 2007

(54) INTELLIGENT LOCK THAT CAN SET A KEY CODE BY ITSELF, A KEY WHICH CAN BE USED FOR MANY LOCKS AND A SETTING TOOL THEREOF

(76) Inventor: Xiao Ming Zhai, No. 33-18 JingZhong Lane, JiangSu (CN) 225003

( * ) Notice: Subject to any disclaimer, the term of this patent is extended or adjusted under 35 U.S.C. 154(b) by 230 days.

(21) Appl. No.: 10/432,464

(22) PCT Filed: Nov. 22, 2001

(86) PCT No.: PCT/CN01/01579

§ 371 (c)(1),
(2), (4) Date: May 21, 2003

(87) PCT Pub. No.: WO02/42584

PCT Pub. Date: May 30, 2002

(65) Prior Publication Data

US 2004/0027236 A1 Feb. 12, 2004

(30) Foreign Application Priority Data

Nov. 22, 2000 (CN) ................................ 00 1 33249

(51) Int. Cl.
*H04Q 9/00* (2006.01)

(52) U.S. Cl. ..................... 340/5.6; 340/5.61; 340/5.64; 340/5.8; 340/825.69; 340/825.72; 340/5.22; 340/5.21; 340/5.2; 340/5.25

(58) Field of Classification Search ............... 340/5.61, 340/5.25, 5.2, 5.21, 5.22, 825.72, 825.69, 340/5.8, 5.64, 5.6

See application file for complete search history.

(56) References Cited

U.S. PATENT DOCUMENTS

| | | | | |
|---|---|---|---|---|
| 4,207,555 | A | 6/1980 | Trombly | |
| 4,785,425 | A * | 11/1988 | Lavelle | 365/52 |
| 4,791,280 | A * | 12/1988 | O'Connell et al. | 235/382.5 |
| 5,477,213 | A | 12/1995 | Atarashi | |
| 5,802,485 | A * | 9/1998 | Koelle et al. | 701/29 |
| RE36,505 | E * | 1/2000 | Treharne et al. | 340/5.23 |
| 6,064,316 | A * | 5/2000 | Glick et al. | 340/5.65 |
| 6,331,812 | B1 * | 12/2001 | Dawalibi | 340/5.2 |
| 6,389,856 | B1 * | 5/2002 | Watanuki et al. | 70/186 |
| 6,564,600 | B1 * | 5/2003 | Davis | 70/277 |
| 6,583,712 | B1 * | 6/2003 | Reed et al. | 340/5.21 |
| 6,718,806 | B2 * | 4/2004 | Davis | 70/278.3 |
| 2001/0015691 | A1 * | 8/2001 | Mellen et al. | 340/5.2 |

FOREIGN PATENT DOCUMENTS

| | | |
|---|---|---|
| CN | 1252483 | 5/2000 |
| EP | 0 388 997 | 9/1990 |

* cited by examiner

*Primary Examiner*—Brian Zimmerman
*Assistant Examiner*—Vernal Brown
(74) *Attorney, Agent, or Firm*—Schmeiser, Olsen & Watts

(57) ABSTRACT

An intelligent lock that can set a key code by itself, a key which can be used for many locks, as well as a setting tool are presented. The key may include a housing, a battery, a head, a group of contacts provided on the head, a non-volatile memory, and a special key code. The contacts for power supply and data transmission are connectable with two ends of the battery through respective wires. The intelligent lock system can easily set or cancel a key code by itself, and a single key can operatively replace many kinds of keys. The intelligent lock is cheap and easy to use.

10 Claims, 10 Drawing Sheets

INTELLIGENT LOCK THAT CAN SET A KEY CODE BY ITSELF, A KEY WHICH CAN BE USED FOR MANY LOCKS AND A SETTING TOOL THEREOF

FIELD OF THE INVENTION

The present invention relates to an intelligent electronic lock controlled by a microcomputer. The present invention can be widely used in civil and industrial fields such as doors, drawers, cabinets, boxes, bags, transportation means, machineries and so on.

BACKGROUND OF THE INVENTION

Since locks were invented, locks have been playing an important role in people's daily life. Up to now, locks have two categories. One is mechanical lock and the other is electronic lock. The mechanical lock has simple structure and low cost. However, the mechanical lock has bad security and high interactive opening rates. In addition, one lock can only be opened by one key. Because of the development of modem micro-electronic technology, the electronic lock was invented on the basis of the mechanical lock. The electronic lock can increase the security of lock and the interactive opening rate has almost reduced to zero. In addition, one electronic card can open many locks of the same kind. However, current electronic lock cannot set the key itself, and it needs a desktop outside of the lock body to set the key. Therefore, the electronic lock is not applicable in fields where the desktop is not available (such as a family door) or where people could not use computer (such as people at countryside, children or elder people). Later, the fingerprint electronic lock was invented on the basis of the normal electronic lock. Though it is easy to open lock without a key, the fingerprint electronic lock is expensive, in large volume, and complicated in setting and resetting of fingerprints. In addition, both the normal electronic lock and the fingerprint lock need battery or power supply inside the lock, which can increase their volume. For such reasons, the electronic lock can only be used for doors, but not for drawers, cabinets, boxes, bags, transportation means, machinery, etc., where volume is limited. Moreover, the expiration time period of a battery is about 1 to 1.5 years. If the battery in the electronic lock has not been changed on time because of negligence, the lock may not be opened anymore and it will be unpleasant to pick the lock or break the door.

Conclusively, current existing locks including mechanical and electronic ones, or even fingerprint electronic locks, have so many disadvantages as mentioned above. In addition, they have no way to be simplified for one finger.

SUMMARY OF THE INVENTION

The object of the invention is to overcome disadvantages of locks mentioned above, and to provide an easy way to set or cancel the key by the user himself. The present invention can unify all keys used to open various kinds of multi-purpose locks including door locks, drawer locks, cabinet locks, box and bag locks, traffic means locks, and machinery locks, etc., into one intelligent electronic lock with low cost and easy operation.

The technical solution of the invention is as follows:

The invention discloses an intelligent lock system comprising:

an electronic key including a housing (1), a battery (2), a head (5), a storing means (6), said storing means (6) including a non-volatile memory which can store a special key code, and a group of contacts (4) setting on the head (5), said group of contacts including a plurality of contacts; said contacts are used for power supply and data transmission, and are connected with two poles of the battery (2) and the storing means (6) by wires respectively; and an intelligent lock including a housing (8), a lock hole (7), a lock tongue (9), a latch mechanism (10), a driving mechanism (11), a driving component (12), an electrical circuit board (15), a group of contacts (17) for electrical connection with the electrical key, and a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) can read a key code stored in the connected key by the group of contacts (17) and check whether the key code stored in the connected key is identical with one of the key codes in the storing means (13), and if a result is identical, said control device (16) can drive the driving component (12) to open the lock, wherein said control device (16) can receive special signals and execute the setting or cancel operations of the electronic key according to the received special signals, and wherein there is only one of the intelligent lock and the electronic key that can include a switch device by which a user can execute different operations and accordingly generate different special signals.

According to one embodiment, the control device (16) can connect an electronic key which can open the lock via the lock hole (7) and receive the first special signal and set a corresponding mark in one non-volatile memory unit on the electrical circuit board (15) so that the control device (16) can store the key code of a second electronic key which is inserted after drawing out the previous key into the storing means (13) according to the mark.

According to another embodiment, the control device (16) can connect an electronic key which can open the lock via the lock hole (7) and receive a second special signal and clear out all key codes of the keys stored in the storing means (13) based on the second special signal.

According to another embodiment, the control device (16) can connect an electronic key which can open the lock via the lock hole (7) and receive a third special signal and set a corresponding mark in one non-volatile memory unit on the electrical circuit board (15) so that the control device (16) can cancel the key code of a second electronic key which is inserted after drawing out the previous key into the storing means (13) according to the mark.

According to another embodiment, the control device (16) can connect an electronic key which can open the lock via the lock hole (7) and receive a fourth special signal and clear out all key codes of the keys stored in the storing means (13) based on the second special signal.

According to one embodiment of the invention, the lock can be big or small or for any purposes, and the shape, size, structure and the manner of electrical connection of the lock hole 7 are completely identical. Inside the lock, there is no battery or any power supply. The power supply can be provided by the key. The different key codes stored in the storing means 13 are generated when the lock is setting upon different keys respectively.

Said setting upon one key means giving a key the right to open one lock and storing the key code of said key into the memory of the storing means 13 of said lock. The process of setting can be referred as the registration of the key code of the key in the lock. According to one embodiment of the invention, only the key which has been registered in the lock can open the lock, thus the process to open the lock is the process that the control device 16 in the lock makes check and confirms the key. Of course, the registration of the key can be cancelled thus the process to cancel one key is the process that the control device 16 in the lock clears out the key code of the key from the memory so as to cancel the right of the key to open the lock.

Accordingly, the necessary condition to open one lock by one key is to make registration of the key code of the key in the lock. Therefore, the size of the storing content of the storing means 13 in the lock decides how many keys can be registered in one lock. If the length of the key code is 56 bits in a binary coded system, one lock can make registration of over ten thousand of keys based on present technical level of the storing means (EEPROM).

According to one embodiment of the invention, said key can match a lock which is big or small or for any purpose. The shape, size, structure and the manner of electrical connection of the head 5 are completely identical. The key code of the key is previously stored in the storing means of the key when it is manufactured. The length of the key code can be decided according to the need of security. If the length of the key code is designed at 56 bits in binary coded system, the length can be as larger as several hundred quadrillion in the decimal coded system.

Therefore, it is almost impossible to have same key codes for any two keys and each key will have its unique key code.

In order to increase the security, the storing means 6 can be realized by a chip of microcomputer, which has functions of storage and calculation. The key code is stored in the memory of the microcomputer and its operation mode has the protocol with the control device 16 in the lock when it is manufactured. As a result, the original key code inside the key is operated and secured by the microcomputer, and will be identified by the lock and will be difficult to be decoded.

It is clear that for any key, no new data will be needed to write into the key after it is manufactured. Therefore, the key can open as many locks as needed.

The different lock systems are constructed by different setting and cancel manners. Based on the invention, though each key will have its unique key code, it is not necessary that each key can only open a specified lock after it is manufactured. Similarly, for each lock, it is not necessary that each lock can only match a specified key. The key and lock in the invention can be in combination or separation at the user's discretion. Among a lot of locks and a lot of keys, any key can be set as the key of any lock, and can be cancelled at any time as well. The combination of the key and the lock can be decided by the setting and cancel of the lock at user's discretion.

The invention further discloses an intelligent lock system comprising:

an electronic key including a housing (1), a battery (2), a head (5), a storing means (6), said storing means (6) including a non-volatile memory which can store a special key code, and a group of contacts (4) setting on the head (5), said group of contacts including a plurality of contacts; said contacts are used for power supply and data transmission, and are connected with two poles of the battery (2) and the storing means (6) by wires respectively; and an intelligent lock including a housing (8), a lock hole (7), a lock tongue (9), a latch mechanism (10), a driving mechanism (11), a driving component (12), an electrical circuit board (15), a group of contacts (17) for electrical connection with the electrical key, and a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) can read a key code stored in the connected key by the group of contacts (17) and check whether the key code stored in the connected key is identical with one of the key codes in the storing means (13), and if a result is identical, said control device (16) can drive the driving component (12) to open the lock, wherein said control device (16) can receive special signals and execute the setting or cancel operations of the electronic key according to the received special signals, and a connector which is used to make electrical connection between the group of contacts of at least two electronic keys and the group of contacts (17) inside the lock hole (7), said connector including a housing (19), a plug (23) which can insert into the lock hole (7), at least a first hole (20) and a second hole (21) in which key can be inserted, wherein the plug (23) has a group of contacts (22), and the first hole (20) and the second hole (22) include corresponding contacts, wherein there is only one of the intelligent lock, electronic key and connector that can include a switch device by which a user can execute different operations and accordingly generate different special signals, and wherein when the connector is inserted into the lock hole (7), the control device (16) can read two key codes of two electronic keys inserted into the first hole (20) and the second hole (21) respectively, and when one of the key codes of keys is identical with the key code stored in the storing means (13), said control device (16) can store the key code of the other key into the storing means (13).

The invention further disclosed an intelligent lock system comprising:

an electronic key including
a housing (1),
a battery (2),
a head (5),
a storing means (6), said storing means (6) including a non-volatile memory which can store a special key code, and
a group of contacts (4) setting on the head (5), said group of contacts including a plurality of contacts; said contacts are used for power supply and data transmission, and are connected with two poles of the battery (2) and the storing means (6) by wires respectively; and
an intelligent lock including
a housing (8),
a lock hole (7),
a lock tongue (9),
a latch mechanism (10),
a driving mechanism (11),
a driving component (12),
an electrical circuit board (15),
a group of contacts (17) for electrical connection with the electrical key, and
a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) can read a key code stored in the connected key by the group of contacts (17) and check whether the key code stored in the connected key is identical with one of the key codes in the storing means (13), and if a result is identical, said control device (16) can drive the driving component (12) to open the lock, wherein said control device (16) can receive special signals and execute the setting or cancel operations of the electronic key according to the received special signals,
a setting tool used together with an electronic key and an intelligent lock, said setting tool including
a housing (25),
a keyhole (26),
a connecting device (28) having one plug, and
an integrated circuit (24) having a memory unit, wherein the plug has a group of contacts (27) connecting with a lock hole (7) of the intelligent lock when it is inserted, and a group of contacts (27) in the keyhole (26) connecting with the connects of the plug and the integrated circuit (24) which has a preset key code of the setting tool, wherein the storing means (13) includes a special memory unit for storing the key code of the setting tool, and wherein there is only one of the intelligent lock, electronic key and the setting tool that can include a switch device by which a user can execute different operations and accordingly generate different special signals.

According to one embodiment the control device (16) can read the key code of connected setting tool by the group of contacts (17) and check whether the key code of the setting tool is identical with the key code of stored in the special memory unit of the storing means (13), if identical, the control device (16) shall execute setting or cancel operation upon the key or upon the setting tool at the same time based on received special signal.

According to another embodiment, when the setting tool is inserted into the lock hole of the intelligent lock and there is an electronic key inserted into the keyhole (26), if the intelligent lock can confirm the key code of the setting tool, the key code of the electronic key inserted into the keyhole (26) of the setting tool shall be stored into the intelligent lock.

According to another embodiment, when the setting tool is inserted into the lock hole of the intelligent lock and there is an electronic key inserted into the keyhole (26), if the intelligent lock can confirm the key code of the setting tool, depending on different special signals the control device (16) can clear out the key code of the key connected with the intelligent lock or clear out all key codes of all keys.

According to another embodiment, the setting operation of the setting tool is to store the key code of the setting tool inserted into the lock into the storing means (13); and the cancel operation of the setting tool is to clear out the key code of the setting tool inserted into the lock from the storing means (13).

According to another embodiment, when the setting tool is inserted into the lock hole of the intelligent lock and there is an electronic key inserted into the keyhole (26), if the storing means (13) has no key code the setting tool, the control device (16) shall store the key code of the setting tool into the special memory unit of the storing means (13).

The invention further discloses an intelligent lock system comprising:
an electronic key including
a housing (1),
a battery (2),
a head (5),
a storing means (6), said storing means (6) including a non-volatile memory which can store a special key code, and
a group of contacts (4) setting on the head (5), said group of contacts including a plurality of contacts; said contacts are used for power supply and data transmission, and are connected with two poles of the battery (2) and the storing means (6) by wires respectively; and
an intelligent lock including
a housing (8),
a lock hole (7),
a lock tongue (9),
a latch mechanism (10),
a driving mechanism (11),
a driving component (12),
an electrical circuit board (15),
a group of contacts (17) for electrical connection with the electrical key, and
a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) can read a key code stored in the connected key by the group of contacts (17) and check whether the key code stored in the connected key is identical with one of the key codes in the storing means (13), and if a result is identical, said control device (16) can drive the driving component (12) to open the lock, and a multi-digit switch device connected with the control device (16) by which the user can enter a multi-digit key code into the control device (16), the storing means (13) having a special key code unit which is used to set or cancel the key, wherein the control device (16) shall accept and check if the special key cord inputted by the multi-digit switch device is identical with that stored in the storing means (13), and execute setting or cancel operations of corresponding electronic key.

The invention further discloses a setting tool used together with an electronic key and an intelligent lock, comprising:

a housing (25), a keyhole (26), a connecting device (28) having one plug, and an integrated circuit (24) having a memory unit, wherein the plug has a group of contacts (27) connecting with a lock hole (7) of the intelligent lock when it is inserted, and a group of contacts (27) in the keyhole (26) connecting with the connects of the plug and the integrated circuit (24) which has a preset key code of the setting tool.

According to one embodiment of the invention, the setting tool comprises a switch device which can be operated by a user, and can generate special signals on the group of contacts (27) corresponding to different operations executed by the user.

The invention further discloses a method for setting upon an electronic key by an intelligent lock, said electronic key having a battery and a special key code, said intelligent lock having key codes of all electronic keys which can open the lock, said method comprising:

1) acquiring power supply from at least one electronic key which is connected with the intelligent lock;
2) judging a key code of the at least one electronic key if it is identical with one of key codes previously stored in the intelligent lock, if the key code of at least one electronic key is identical with one of key codes stored in the intelligent lock, allowing setting or cancel operation upon the electronic key; and
3) executing corresponding setting or cancel operation by the intelligent lock upon the electronic key based on the special signal to make setting or cancel operation.

According to one embodiment, the executing setting or cancel operation uses the electrically connection of a medium connecting device between the at least one electronic key and the intelligent lock.

According to another embodiment, one of the intelligent lock, electronic key, and connector includes a switch device by which a user can execute different operations and accordingly generate different special signals.

The invention further discloses a method for setting operation upon an electronic key by an intelligent lock, the electronic key having a battery and a special key code, the intelligent lock having key codes of all electronic keys which can open the lock and the key code of a setting tool, the setting tool being connected with the intelligent lock and the electronic key, said method comprising:

(1) acquiring power supply from the electronic key which is connected with the intelligent lock;

(2) judging the key code of the setting tool if it is identical with one of key codes of the setting tool previously stored in the intelligent lock, if the key code of the setting tool is identical with the key codes of the setting tool stored in the intelligent lock, allowing setting or cancel operation upon the electronic key and upon itself;

(3) executing setting or cancel operation.

According to one embodiment, when the setting operation is executed and when the setting tool is inserted into the lock hole of the intelligent lock and there is an electronic key inserted into the keyhole (26) of the setting tool, if the intelligent lock has stored the key code of the setting tool, the key code of the electronic key which is inserted into the insert hole of the setting tool (26) shall be stored into the intelligent lock.

According to another embodiment, when the cancel operation is executed and when the setting tool is inserted into the lock hole of the intelligent lock and there is an electronic key inserted into the keyhole (26) of the setting tool, if the intelligent has stored the key code of the setting tool, depending on different special signals the control device (16) can clear out the key code of the key connected with the intelligent lock, clear out all key codes of all keys, or clear out all key codes of all keys and the code of the setting tool.

According to another embodiment, when the setting tool is inserted into the lock hole of the intelligent lock and there is an electronic key inserted into the keyhole (26), if the storing means (13) has no key code the setting tool, the control device (16) shall store the key code of the setting tool into the special memory unit of the storing means (13).

According to another embodiment, the special signal is generated by a user from a switch device of the electronic key, the intelligent lock or the setting tool.

Based on different habit and mentality of people to use the lock, the setting and cancel manners of the key are accordingly different. Therefore, the invention provides four embodiments based on different setting and cancel manners:

1. The First Embodiment of the System—Key Setting Key (Offline Mode)

The user may use key to set key in offline mode by inserting the key into an intelligent lock. According to the first embodiment, a storing means 13 of the lock includes a power-failure reserve memory which is used to store manual operation signal (i.e. special signal) generated before there is power failure. Meanwhile, there is only one switch device 3 mounted on the lock or on the key in the system, which is used to generate manual operation signal (i.e. special signal) and is connected with its electrical circuit.

2. The Second Embodiment of the System—Key Setting Key (Online Mode)

The user may use key to set key in online mode by a lock and a connector which can connect corresponding contacts in parallel on their heads 5. The connector is used specially to set the key. The connector includes a housing 19, a plug 23, a first hole 20, a second hole 21 and a group of contacts 22, which is distributed on the plug 23 and on the inner walls of the first hole 20 and the second hole 21. The shape, size, structure, positions of contacts and the manner of electrical connection of the plug 23 are completely identical with that of the head 5 of the key. The shape, size, structure, positions of contacts and the manner of electrical connection of the first hole 20 and the second hole 21 are completely identical with that of the lock hole 7. The contacts distributed on the plug 23 and the contacts distributed on the same hole are insulated from each other and corresponding contacts of the three components are connected in parallel by wires.

The control device 16 in the lock includes an inquiry identifier which is used to inquire and identify if there is a second source of data input. Meanwhile, there is only one switch device 3 mounted on the lock, on the key or on the connector, which is used to generate manual operation signal and is connected with its electrical circuit.

3. The Third Embodiment of the System—Setting the Key by the Setting Tool

Based on the second embodiment, the user may combine the connector and one of the keys into a whole, and remove the battery 2 in the key to simplify the structure. The connection style of all components in the electrical circuit is unchanged so that a setting tool which is specially used to set the key is formed. The setting tool includes a housing 25, and the connecting device 28, and an integrated circuit 24 which stores the key code of the setting tool and is connected with the connecting device 28.

Obviously, the third embodiment is similar with the second embodiment except the mechanical structure. The control device 16 includes an inquiry identifier which is used to inquire and identify if there is a second source of data input. Meanwhile, there is only one switch device 3 mounted on the lock, on the key or on the setting tool, which is used to generate manual operation signal and is connected with the electrical circuit.

4. The Fourth Embodiment of the System—Setting the Key by the Multi-digit Switch The user may set the key by a multi-digit switch. The multi-digit switch device 3 on the lock is connected with the control device 16 to form an electrical circuit in the system. The multi-digit switch device 3 includes some independent switch devices which are combined into a whole, and each independent switch device can generate different data by setting its buttons manually. These data can be binary coded system, decimal coded system or otherwise. The independent switch device of each bit is connected accordingly with the input port of parallel data on the control device 16 by the electrical circuit board 15. Such switch devices are connected respectively with some input ports of parallel data on the control device 16. Since the working state of each independent switch device is generated manually, a set of such independent switch devices can form a variable data generator, or a key code generator or a second source of data input.

The advantages of the invention are as follows:

1. Since each key has its unique key code instead that the ordinal electronic lock has its only lock code, the lock shall check the key code of the key stored into the lock instead that the ordinal electronic lock shall check the lock code stored into the key. Thus the volume requirement of the storing means in the key to store data is largely reduced, and it is possible for one key to open unlimited locks.
2. Since no data are needed to write into the key when the key is manufactured, the setting and cancel of the key can be completed by a lock. Thus it is possible, easy and convenient to set or cancel the key on each lock.
3. Since no battery or power supply is needed in the lock, the unpleasant case to be forced to pick the lock or break the door due to failure of the battery or power supply can be avoided.
4. Since no battery or power supply is needed in the lock, the volume of the lock can be largely reduced. Thus an electronic lock can be popularized in those places where the volume of the lock is confined (e.g. drawers, cabinets, boxes, bags, transportation means, machineries and so on).
5. Since the key can transmit the key code and have certain mechanical strength, it can be suitable not only for the lock with the handle to transmit the key code only, but also for the lock without the handle to transmit the key code and to drive the lock tongue to open the lock. The habit and mentality of people to use the lock can remain.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE EMBODIMENTS

Figure 1:
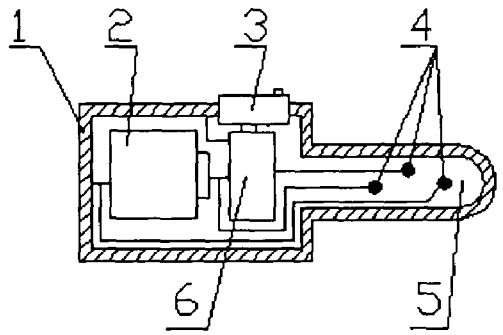
FIG. 1 is the sectional view of the structure of the electronic key according to one embodiment of the invention.

According to one embodiment, said setting operation of the electronic key is to store the key code of the connected electronic key into the storing means (13) so that said electronic key can open the lock.

According to another embodiment, said cancel operation upon the electronic key is to clear out the key codes stored in the storing means (13) so that the electronic keys corresponding to these key codes could not open the lock; or to clear out the key code of the connected key in the storing means (13) so that the key corresponding to the key code could not open the lock.

According to another embodiment, the intelligent lock further comprises a switch device operated by a user, said switch device being connected with the control device (16) and generating special signals corresponding to different operations by the user, said control device (16) executing setting or cancel operations corresponding to the key according to said special signal.

According to another embodiment, the control device (16) can receive the special signal from the electronic key.

According to another embodiment, the control device (16) can receive the special signal from a setting tool.

According to another embodiment, the storing means (13) includes a special memory unit for storing the key code of the setting tool.

According to another embodiment, the control device (16) can read the key code of connected setting tool by the group of contacts (17) and check whether the key code of the setting tool is identical with the key code of stored in the special memory unit of the storing means (13), if identical, the control device (16) shall execute setting or cancel operation upon the key or upon the setting tool at the same time based on received special signal.

According to another embodiment, the setting operation of the setting tool is to store the key code of the setting tool inserted into the lock into the storing means (13) so that the control device (16) executes setting or cancel operation upon the setting tool or upon the key connected with the setting tool based on received special signal; and the cancel operation of the setting tool is to clear out the key code of the setting tool inserted into the lock from the storing means (13) so that the control device (16) could not execute setting or cancel operation upon the setting tool or the key connected with the setting tool.

According to another embodiment, the control device (16) can connect an electronic key which can open the lock via the lock hole (7) and receive the first special signal and set a corresponding mark in one non-volatile memory unit on the electrical circuit board (15) so that the control device (16) can store the key code of a second electronic key which is inserted after drawing out the previous key into the storing means (13) according to the mark.

According to another embodiment, the control device (16) can connect an electronic key which can open the lock via the lock hole (7) and receive a second special signal and clear out all key codes of the keys stored in the storing means (13) based on the second special signal.

According to another embodiment, the intelligent lock further comprises a connector which is used to make electrical connection between the group of contacts of at least two electronic keys and the group of contacts (17) inside the lock hole (7), said connector including a housing (19), a plug (23) which can insert into the lock hole (7), at least a first hole (20) and a second hole (21) in which key can be inserted, wherein the plug (23) has a group of contacts (22), and the first hole (20) and the second hole (22) include corresponding contacts.

According to another embodiment, the connector further includes a switch device which can be operated by a user and can generate special signals on the group of contacts (22) corresponding to different operations by the user.

According to another embodiment, when the connector is inserted into the lock hole (7), the control device (16) can read two key codes of two electronic keys inserted into the first hole (20) and the second hole (21) respectively, and when one of the key codes of keys is identical with the key code stored in the storing means (13), said control device (16) can store the key code of the other key into the storing means (13).

According to another embodiment, the intelligent lock further comprises a multi-digit switch device by which the user can enter multi-digit key code into the control device (16), said switch device being connected with the control device (16) which can execute setting or cancel operations of corresponding electronic key based on the special key code entered into the multi-digit switch device.

According to another embodiment, the setting tool further comprises a switch device which can be operated by a user, and can generate special signals on the group of contacts (27) corresponding to different operations executed by the user.

According to another embodiment, the intelligent lock system further comprises a setting tool used together with an electronic key and an intelligent lock, said setting tool including a housing (25), a keyhole (26), a connecting device (28) having one plug, and an integrated circuit (24) having a memory unit, wherein the plug has a group of contacts (27) connecting with a lock hole (7) of the intelligent lock when it is inserted, and a group of contacts (27) in the keyhole (26) connecting with the connects of the plug and the integrated circuit (24) which has a preset key code of the setting tool, wherein when the setting tool is inserted into the lock hole of the intelligent lock and there is an electronic key inserted into the keyhole (26), if the intelligent lock can confirm the key code of the setting tool, the key code of the electronic key inserted into the keyhole (26) of the setting tool shall be stored into the intelligent lock; and wherein when the setting tool is inserted into the lock hole of the intelligent lock and there is an electronic key inserted into the keyhole (26), if the intelligent lock can confirm the key code of the setting tool, depending on different special signals the control device (16) can clear out the key code of the key connected with the intelligent lock or clear out all key codes of all keys.

According to another embodiment, the control device (16) can read the key code of connected setting tool by the group of contacts (17) and check whether the key code of the setting tool is identical with the key code of stored in the special memory unit of the storing means (13), if identical, the control device (16) shall execute setting or cancel operation upon the key or upon the setting tool at the same time based on received special signal.

According to another embodiment, the setting operation of the setting tool is to store the key code of the setting tool inserted into the lock into the storing means (13) so that the control device (16) executes setting or cancel operation upon the setting tool or upon the key connected with the setting tool based on received special signal; and the cancel operation of the setting tool is to clear out the key code of the setting tool inserted into the lock from the storing means (13) so that the control device (16) could not execute setting or cancel operation upon the setting tool or the key connected with the setting tool.

According to another embodiment, when the setting tool is inserted into the lock hole of the intelligent lock and there is an electronic key inserted into the keyhole (26), if the storing means (13) has no key code the setting tool, the control device (16) shall store the key code of the setting tool into the special memory unit of the storing means (13).

According to another embodiment, the intelligent lock system further comprises a connector which is used to make electrical connection between the group of contacts of at least two electronic keys and the group of contacts (17) inside the lock hole (7), said connector including a housing (19), a plug (23) which can insert into the lock hole (7), at least a first hole (20) and a second hole (21) in which key can be inserted, wherein the plug (23) has a group of contacts (22), and the first hole (20) and the second hole (22) include corresponding contacts.

According to another embodiment, there is only one of the intelligent lock, electronic key, setting tool and connector, can include a switch device by which a user can execute different operations and accordingly and generate different special signals.

According to another embodiment, the control device (16) can connect an electronic key which can open the lock via the lock hole (7) and receive the first special signal and set a corresponding mark in one non-volatile memory unit on the electrical circuit board (15) so that the control device (16) can store the key code of a second electronic key which is inserted after drawing out the previous key into the storing means (13) according to another embodiment the mark.

According to another embodiment, the control device (16) can connect an electronic key which can open the lock via the lock hole (7), and when the control device (16) receives a third special signal, the control device (16) shall clear out all key codes of keys stored in the storing means (13), and shall store the key code of the next electronic key which is inserted after drawing out the previous key into the storing means (13).

1. One Embodiment of the Structure of the Key

As shown on FIG. 1, a storing means 6 is an EEPROM-like memory, and a switch device 3 can be included depending on the different technical solutions.

2. One Embodiment of the Structure of the Lock

Figure 2:
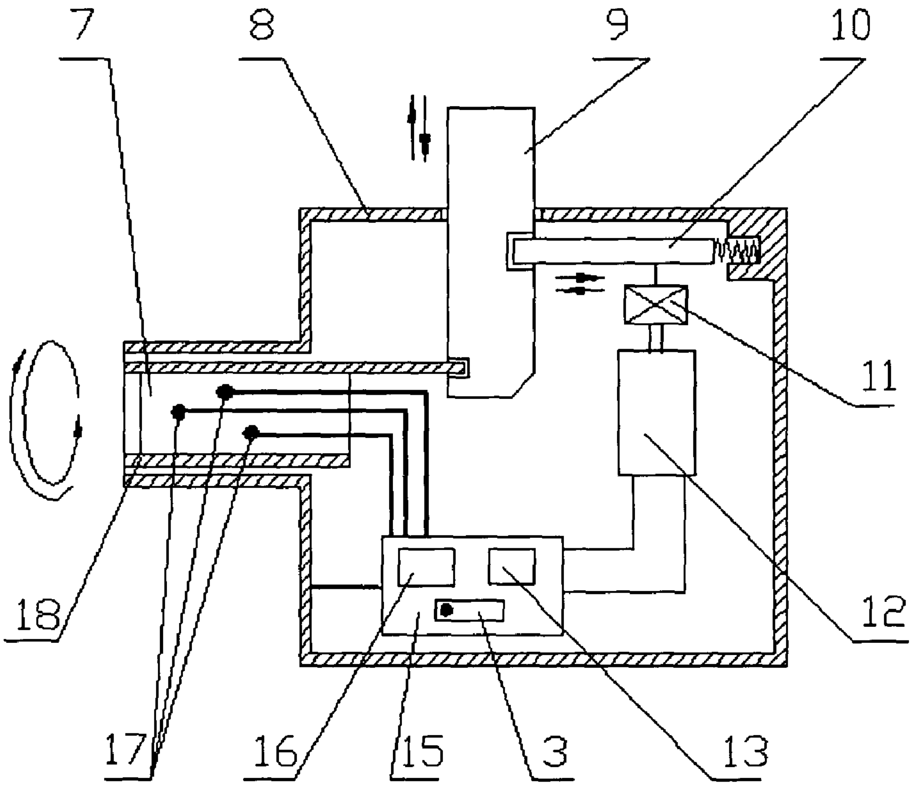
FIG. 2 is the sectional view of the structure of the intelligent lock according to another embodiment of the invention.

As shown on FIG. 2, a storing means 13 is an EEPROM-like memory, and a control device 16 is a microcomputer (e.g. Series 89 etc.) on which the program is introduced. According to another embodiment, the storing means 13 and the control device 16 can be an integrated circuit which merges the storing means 13 and the microcomputer. The switch device 3 can be included depending on the different technical solutions. In one embodiment shown as FIG. 2, if the setting and cancel operations of the key are not in consideration, the rule of opening the lock is as follows. When a head 5 of the key is inserted into a lock hole 7, a battery 2 in the key shall provide power supply to the lock via a group of contacts 4 and 17 by wires. The control device 16 of the system shall first ask for key codes when it is energized. The key shall input key codes stored in the storing means 6 via the group of contacts 4 and 17 into the control device 16. Then a data comparator in the control device 16 shall make comparison one by one between the key code of the key and those registered in the storing means 13. If none of registered key codes is identical with the key code of the key, the control device 16 will enter into the sleep mode and ignore the key. If one registered key code is identical with the key code of the key, the control device 16 shall output a timing pulse power supply to a driving component 12. The driving component 12 can be a motor or a magnet, and can transfer the direction and form of the torque by a driving mechanism 11 to drive a latch mechanism 10 to make parallel motion so that the lock tongue 9 is shifted. At this time, when the user turns the key to drive the lock hole 7, the extension bar on the right side of the lock hole 7 shall bring the lock tongue 9 to move downward to open the lock. Once the timing power supply outputted from the control device 16 to the driving component 12 reaches its preset time, the driving component 12 shall be deenergized and the latch mechanism 10 shall press the lock tongue 9 under the push of the spring. At this time, when the user turns the key in reverse direction to rise up the lock tongue to a certain position, the left side of the latch mechanism 10 shall drop in to the recess of the lock tongue 9 again so that the lock is closed.

Of course, similar to current existing mechanical locks, it is also completely practicable to use a handle to drive the lock hole 7 or use a handle to directly drive the lock tongue to open or close the lock.

3. First Embodiment of the Key-lock System

Figure 3:
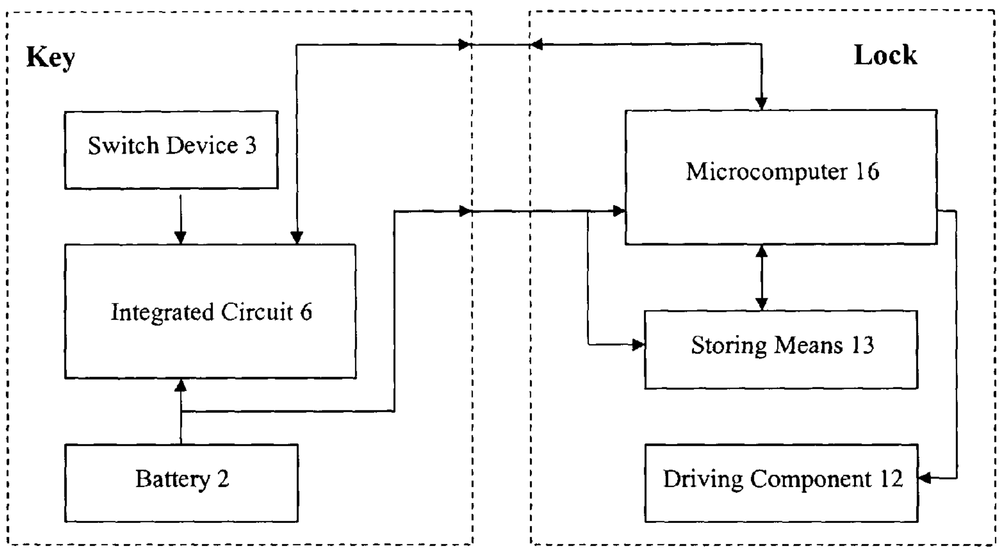
FIG. 3 is a block diagram of an electrical circuit according to a first embodiment of the invention in which a switch device 3 is mounted on one side of the key and is connected with a storing means 6.
Figure 4:
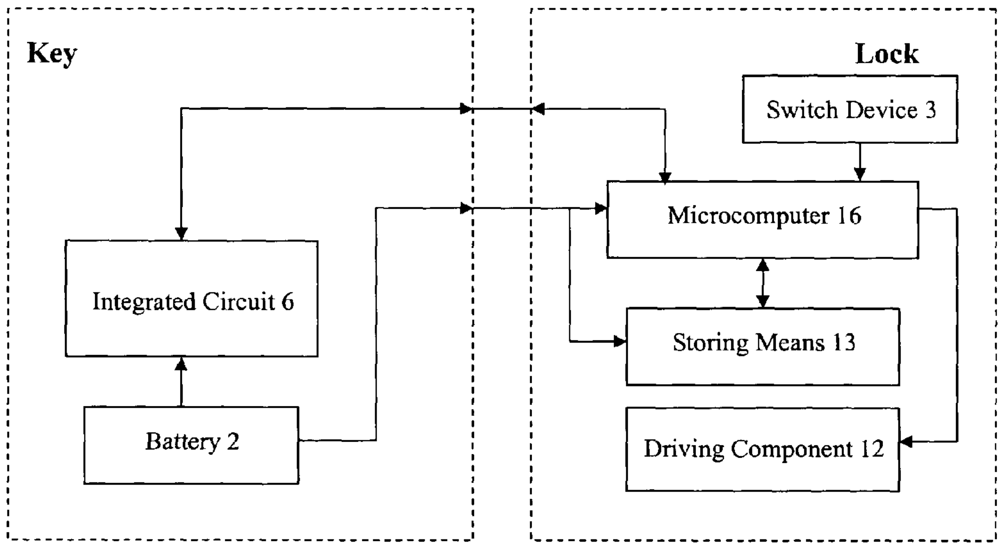
FIG. 4 is the block diagram of the electrical circuit according to the first embodiment of the invention in which the switch device 3 is mounted on one side of the lock.
Figure 5:
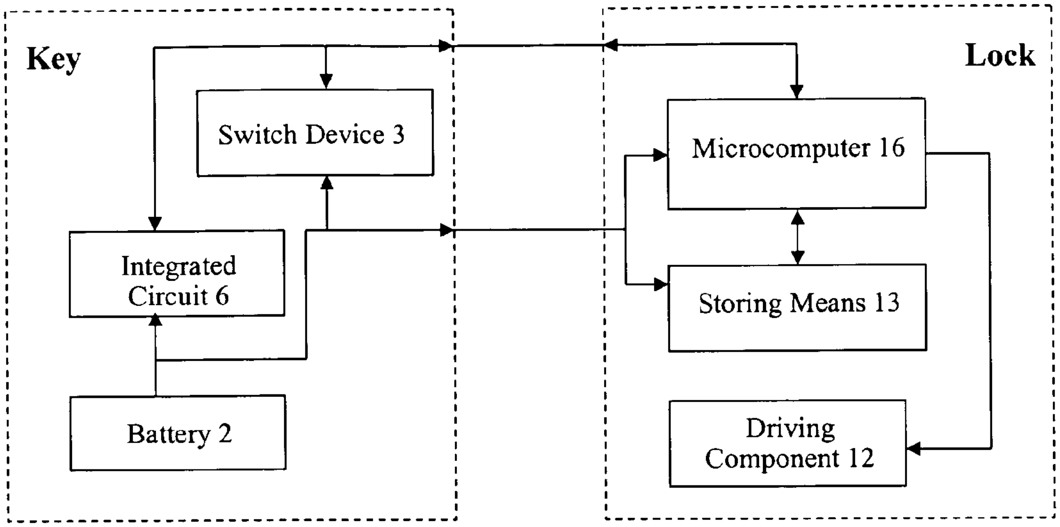
FIG. 5 is the block diagram of the electrical circuit according to the first embodiment of the invention in which the switch device 3 is mounted on one side of the key and is connected with contacts in the group of contacts 4.

The block diagrams of the electrical circuit of the first embodiment of the system are shown as in FIG. 3, FIG. 4 and FIG. 5. According to the first embodiment, the switch device 3 is used to generate manual operation signal in the system. The installation position of the switch device 3 is flexible in the system. For example, the switch device 3 can be mounted on the key side to connect with the storing means 6 (shown on FIG. 3), or to connect with corresponding contacts on the group of contacts 4 on the head 5 (shown on FIG. 5), so that the signal inputted by the key can be changed when it is switched on or off by manual operation. The switch device 3 can be also mounted on the lock to connect with one data input terminal (shown on FIG. 4) of the control device 16 to change its input state by manual operation. As shown at FIG. 3, the switch device 3 is set on the key. The signal generated by manual operation on the switch device 3 and transmitted to the control device 16 is called manual operation signal. In addition, there is a power-failure reserve memory on the storing means 13, which is used to store manual operation signal generated before the there is a power-failure.

According to the first embodiment, the setting and cancel operations of the key are executed by the switch device 3. Setting and cancel signals can be generated by different manual operations for completion. According to the first embodiment, the setting of the key is designed as follows. The user inserts a key A which can open the lock into the lock hole 7 to open the lock, makes the switch device 3 to be switched on or off three times within 3 seconds, and withdraws the key A from the lock hole, so that the key code of a key B which originally cannot open the key is registered into the lock unconditionally and the key B can open the lock. Meanwhile, the cancel of the key is designed as follows. The user uses the key A to open the lock and makes the switch device 3 to be switched on or off continuously over 10 seconds, so that all key codes stored in the key code memory of the lock (including the key code of key A itself) shall be cleared off. At this time, though all key codes in the key code memory are cleared off, the system can unconditionally register the key code of any new key inserting in the lock, thus the new key shall acquire the right of setting and cancel the lock. Of course the new key can give up such a right.

The lock made according to the first embodiment shall not need any defined key for match when the lock is manufactured.

Figure 6:
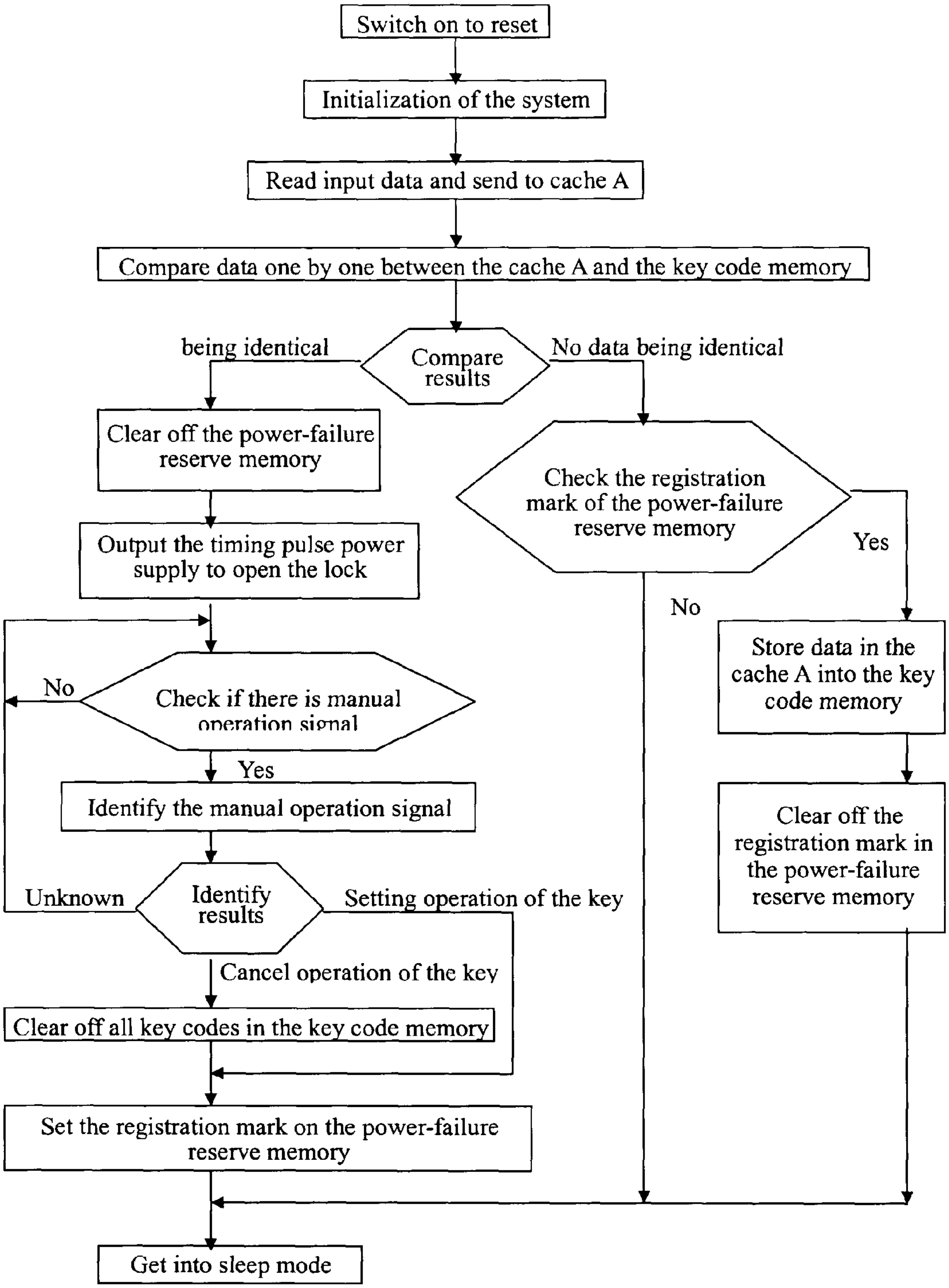
FIG. 6 is the flow chart of a control device 16 according to the first embodiment of the invention.

FIG. 6 is the flow chart of the control device 16 according to the first embodiment. When the key is inserted into the lock hole 7, the whole system is energized and initialized. The control device 16 shall first ask for key codes of the key, and store the data inputted by the key into the cache A of the storing means 6. A data comparator of the control device compares one by one between the data in the cache A and those registered in the storing means 13. If one key code is identical with the data in the cache A, the power-failure reserve memory shall be cleared and a timing pulse power supply to open the lock shall be outputted to drive the driving element 12 to complete the action to open the lock. A detection identifier shall make detection and identification upon possible manual operation signals, that is to detect and identify whether the switch device 3 is operated by a person. If that is the case, the detection identifier shall identify which kind operation it is. If it is the setting operation of the key, the detection identifier shall set registration mark on the power-failure reserve memory. If it is the cancel operation of the key, the detection identifier shall clear off all key codes stored in the key code memory in the storing means 13, and then set registration mark on the power-failure reserve memory. If manual operation signal cannot be identified, the detection identifier shall detect continuously. If none of key codes in the key code memory is identical with the data in the cache A in previous comparison, the power-failure reserve memory shall be checked if there is registered mark. If not, the system shall enter into the sleep mode. If yes, the data in the cache A shall be stored in the key code memory and the registered mark in the power-failure reserve memory shall then be cleared off.

4. Second Embodiment of the Key-lock System

Figure 7:
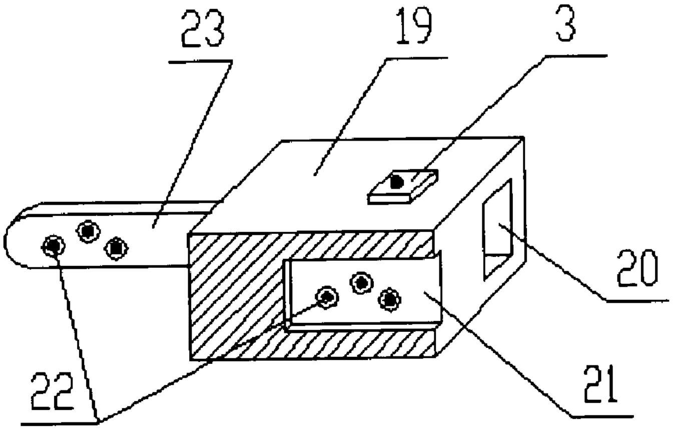
FIG. 7 is the cubic sectional view of the connector according to a second embodiment of the invention.
Figure 9:
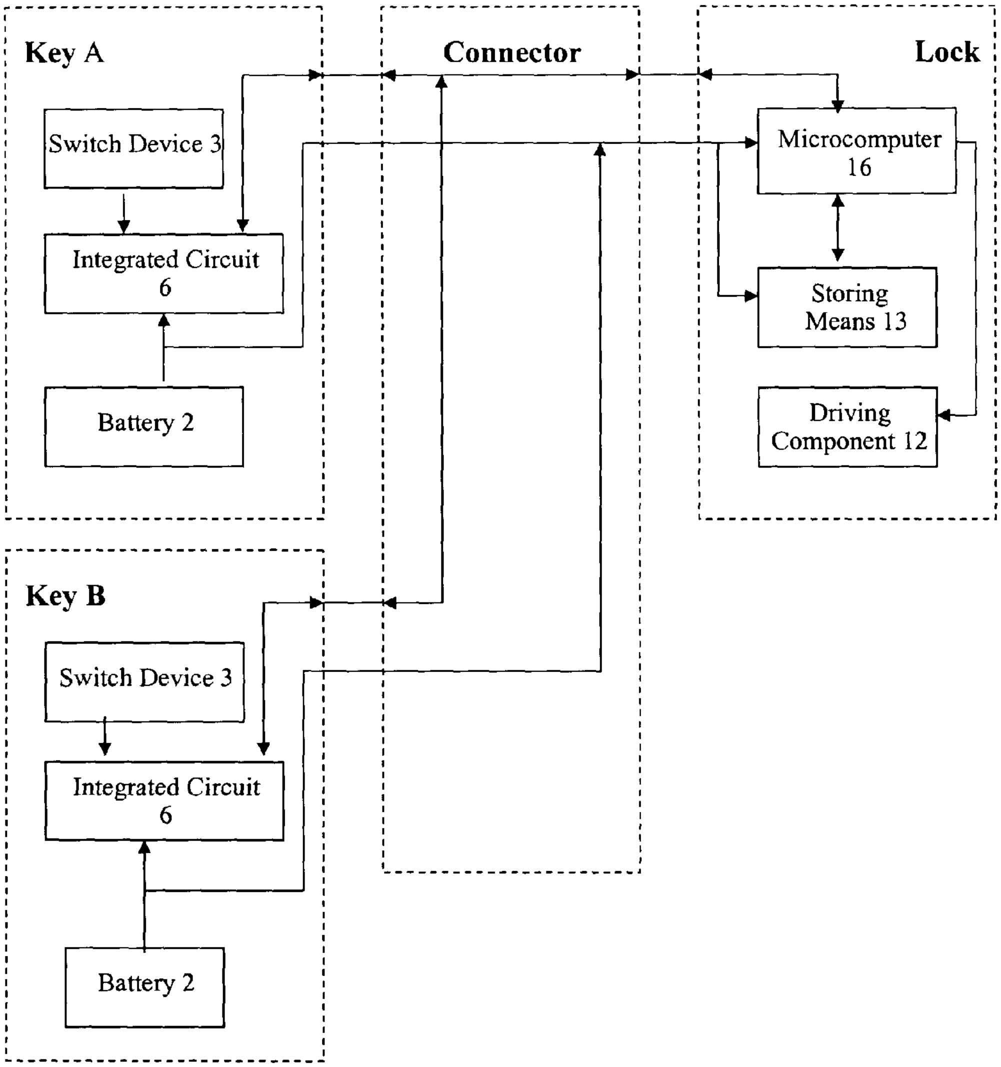
FIG. 9 is the block diagram of the electrical circuit according to the second embodiment of the invention in which the switch device 3 is mounted on one side of the key.
Figure 10:
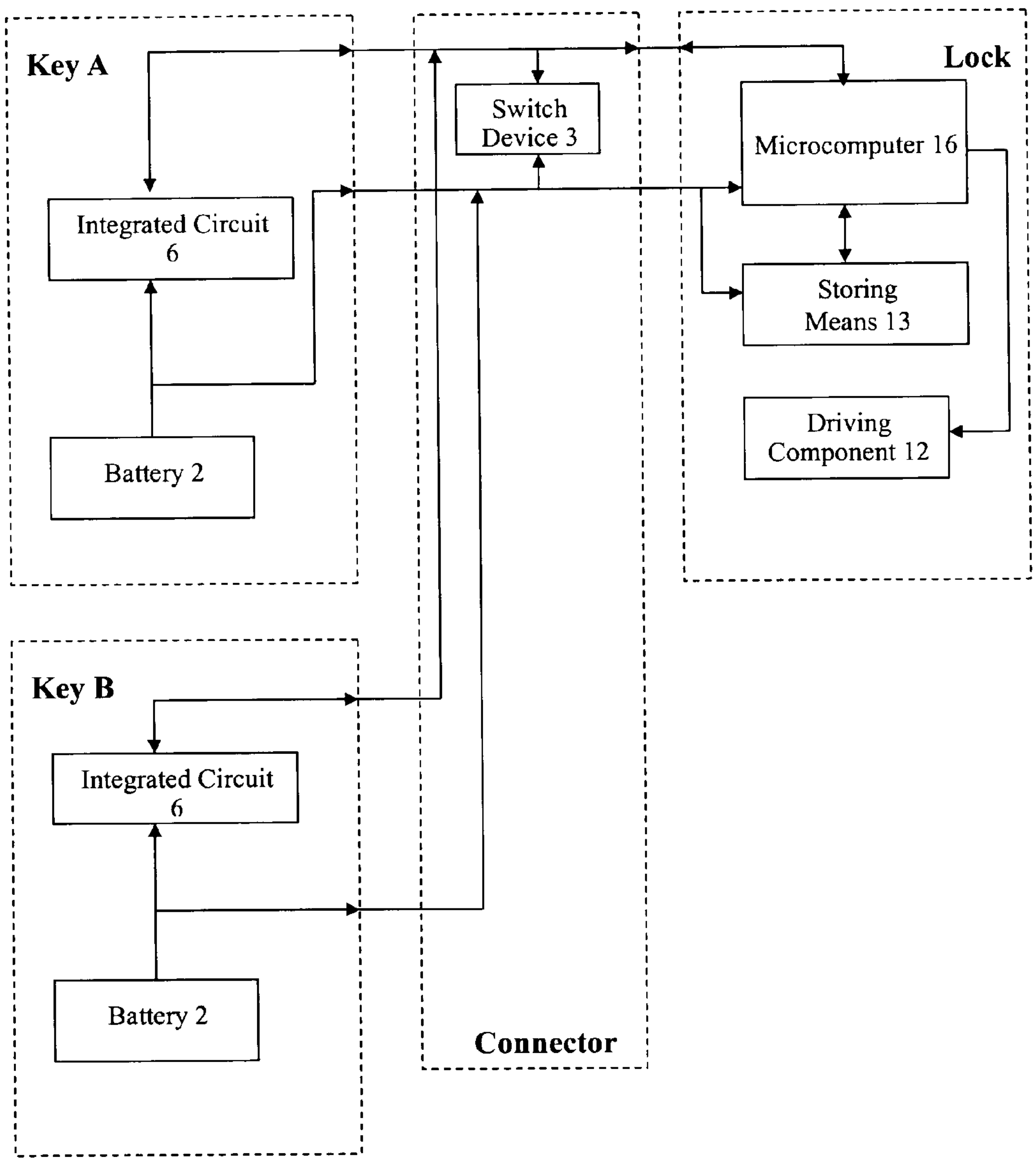
FIG. 10 is the block diagram of the electrical circuit according to the second embodiment of the invention in which the switch device 3 is mounted on one side of the connector.

The block diagrams of the electrical circuit of the key-lock system are shown as FIG. 9 and FIG. 10. In the FIGS. 9 and 10, two keys are connected in parallel with the lock by a connector. The cubic sectional view of one embodiment of the connector is shown in FIG. 7. Similar to the first embodiment, there is a switch device 3 to generate manual operation signal. The installation position of the switch device 3 is flexible. For example, the switch device 3 can be mounted on the key (shown on FIG. 9) or on the connector (shown on FIG. 10), so that it can change the signal inputted by the key when it is switched by manual operation. The switch device 3 can also be mounted on the lock (Figure is omitted) to connect with one data input terminal of the control device 16 to change its input state by manual operation. FIG. 10 shows that the switch device 3 is set on the connector. In addition, the control device 16 can include an inquire identifier to inquire and identify whether there is a second source of data input.

According to the second embodiment of the invention, the user can use one key A which can open the lock to set the lock so that key B can open the lock as well. The user inserts two keys respectively into a first hole 20 and a second hole 21 of the connector, and then inserts a plug 23 of the connector into the lock hole 7. At this time batteries in two keys are connected in parallel to provide power supply to the system. When the system is energized, it shall register the key code of the key B into the lock unconditionally, so that the key B can then also open the lock. Meanwhile, the cancel mode of the key is designed as follows. The user inserts the key A which can open the lock into any hole of the connector, and inserts the plug 23 of the connector into the lock hole. The switch device 3 of the connector can be switched on or off continuously over 10 seconds, so that all key codes stored in the key code memory of the lock except the key code of the key A shall be cleared off. Therefore, only the key A can open the lock. According to the second embodiment, there should be at least one key which can be matched with the lock and open it. Of course, the second embodiment can adopt a similar mode of the cancel with the first embodiment and does not need any defined key for match.

Figure 11:
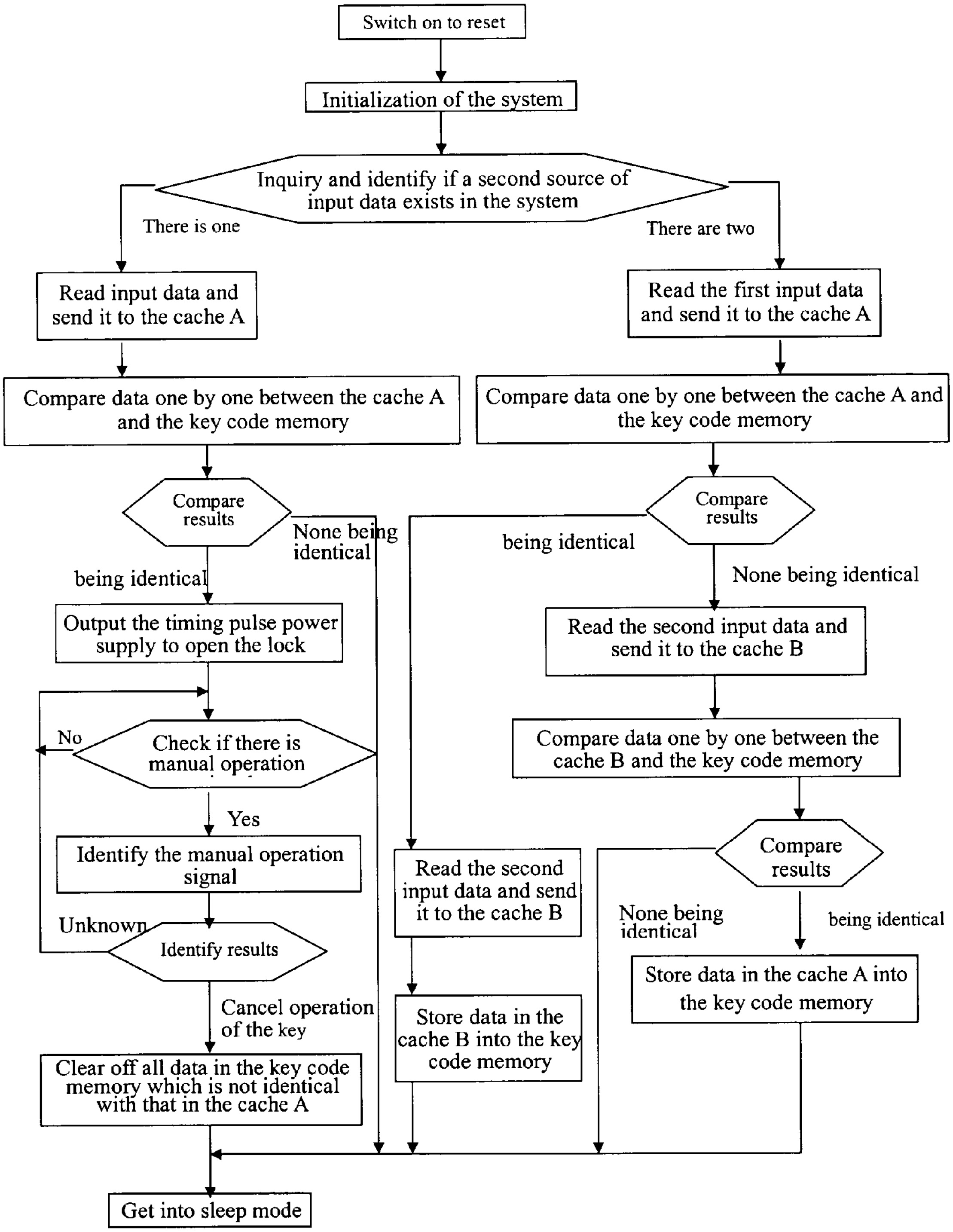
FIG. 11 is the flow chart of the control device 16 according to the second and the third embodiment of the invention.

FIG. 11 is the flow chart of the control device 16 of the system in the second embodiment of the key-lock system. Referring to FIG. 11, when two keys are connected with the lock by the connector, the system is switched on and initialized. The inquire identifier in the control device 16 inquires and identifies if there is the second source of input data in the system. If the result of the inquiry is that there are 2 sources of input data, the control device 16 will read the key code of the first key inserted into one insert hole of the connector and store the key code into cache A. A comparator compares one by one between the data in the cache A and those in the key code memory in the storing means 13. If the key code in the memory is identical with the data in the cache A, the key code of the second key inserted into the another insert hole will be stored into the cache B on the microcomputer 16. Then the data in the cache B will be stored into the storing means 13, so that the registration of the second key is completed. If none of the data in the cache A is identical with the data in the key code memory after comparison, the key code of the second key inserted into the another insert hole will be stored into the cache B, and the comparator compares one by one between the data in the cache B and those in the key code memory. If one of data is identical with that in the cache B, then data in the cache A shall be stored into the key code memory, so that the registration of the first key is completed. If none data in the cache B is identical with the data in the key code memory after comparison, it suggests that neither key can open the lock and the system shall enter into the sleep mode.

When only one key is connected into the system by the connector, the system is setup and the inquiry identifier shall inquire and identify if there is the second source of data input in the system and the result of inquiry shall be: "Only One". The input data from the key will be stored into the cache A. The comparator shall compares one by one between the data in the cache A and those in the key code memory. If none of data is identical with the data in the cache A, the system shall enter into the sleep mode. If one of data is identical with that in the cache A, a timing pulse power supply to open the lock shall be outputted to drive the driving element 12 to complete the action to open the lock. The detection identifier then makes detection and identification upon possible manual operation signals, that is, to detect and identify whether the switch device 3 is operated by a person. If somebody is operating on the switch device 3 and operation requirements are met, all data in the key code memory which are not identical with that in the cache A shall be cleared off. Therefore, all other key codes shall be cancelled except the key code meeting operation requirements. If no manual operation signal occurs in the system or the manual operation signals are not in accordance with the requirement, the detection identifier shall detect continuously.

Figure 8:
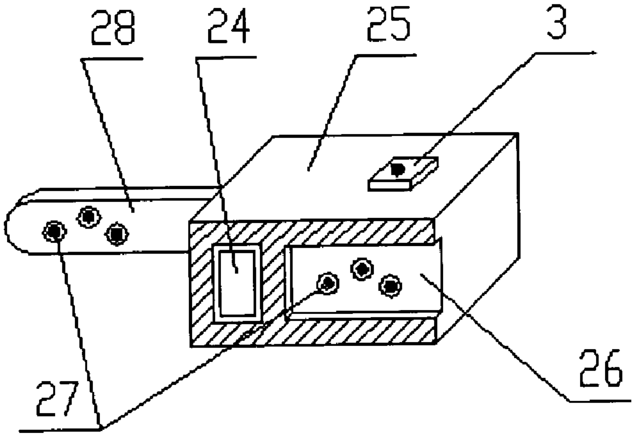
FIG. 8 is the cubic sectional view of the setting tool according to a third embodiment of the invention.
Figure 12:
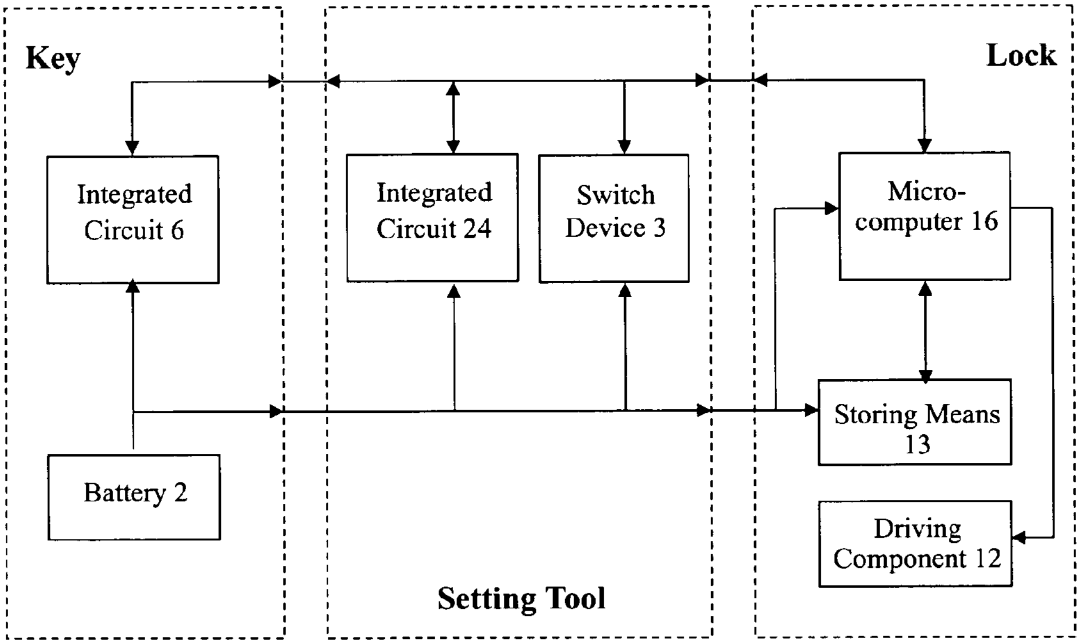
FIG. 12 is the block diagram of the electrical circuit according to the third embodiment of the invention.

The third embodiment of the system is a mechanical structure deformation of the second embodiment of the system. FIG. 12 is a block diagram of the electrical circuit of third embodiment of the system. In addition, the cubic sectional view of the setting tool is shown on FIG. 8. Referring to FIG. 8, the setting tool includes a housing 25, an integrated circuit 24, a connecting device 28, an insert hole 26, a group of contacts 27 and wires. The group of contacts 27 distribute on inner walls of the connecting device 28 and the insert hole 26, and are insulated from each other. The connecting device 28 takes the form of the plug.

The connecting device 28 and the insert hole 26 are completely identical with the plug 23 and the first hole 20 or the second hole 21 in the second embodiment regarding shape, size, structure, positions of contacts and the manner of electrical connection. Thus, as shown in FIG. 7, each of the contacts comprising the group of contacts 22 set on the plug 23 or on the first hole 20 or on the second hole 21 is physically separated from other contacts and electrically spaced apart so as to be insulated from every other contact in the group of contacts 22. Similarly, as depicted in FIG. 2, each of the contacts comprising the group of contacts 17 set on the lock hole 7 is physically separated from other contacts and electrically spaced apart so as to be insulated from every other contact in the group of contacts 17. Likewise, as depicted in FIG. 1, each of the contacts comprising the group of contacts 4 set on the head 5 is physically separated from other contacts and electrically spaced apart so as to be insulated from every other contact in the group of contacts 4. The integrated circuit 24 stores the key code of the setting tool and is connected with the connecting device 28. The key code of the setting tool is previously stored into the lock.

According to the third embodiment of the system, the user inserts the head 3 of the key into the insert hole 26 of the setting tool, then inserts the connecting device 28 into the lock hole 7. Thus, the key code of the key is registered into the lock unconditionally and the key can open the lock. The style to cancel the key according to the third embodiment is the same with that according to the second embodiment. For example, when the switch device 3 is operated by person to be switched on or off continuously over 10 seconds, all key codes stored in the key code memory of the lock except the key code of the setting tool shall be cleared off. Thus all other keys cannot open the lock. After the lock is manufactured according to the third embodiment, there should be at least one defined setting tool which can be matched with the lock. Of course, the third embodiment can adopt similar mode of the cancel with the first embodiment and does not need any defined setting tool for match.

As shown on FIG. 12, the key, the lock and the setting tool are connected in parallel to form the electrical circuit of the system. In case when the electrical circuit is fixed, it is obviously that the setting tool can be combined with the lock or with the key, so that the structure of the setting tool can be changed into a way that the insert hole 26 can be omitted while the connecting device 28 can be changed into a connector in other form. That is, there should be corresponding connector on concerned lock or key to match with the connecting device. When the key is inserted into the lock, the setting tool shall be connected with corresponding connector on the lock or on the key.

Similar with the first and the second embodiments of the system, there is a switch device 3 to generate manual operation signal in the system. The installation position of the switch device 3 is flexible. It can be mounted on the key or the lock (Figure is omitted), or mounted on the setting tool. Here the switch device 3 is mounted on the setting tool (shown on FIG. 12). In addition, there is an inquire identifier in the control device 16 to inquire and identify if there is a second source of data input. Therefore, the third embodiment and the second embodiment are identical except the structure.

6. The Fourth Embodiment of the Key-lock System

Figure 13:
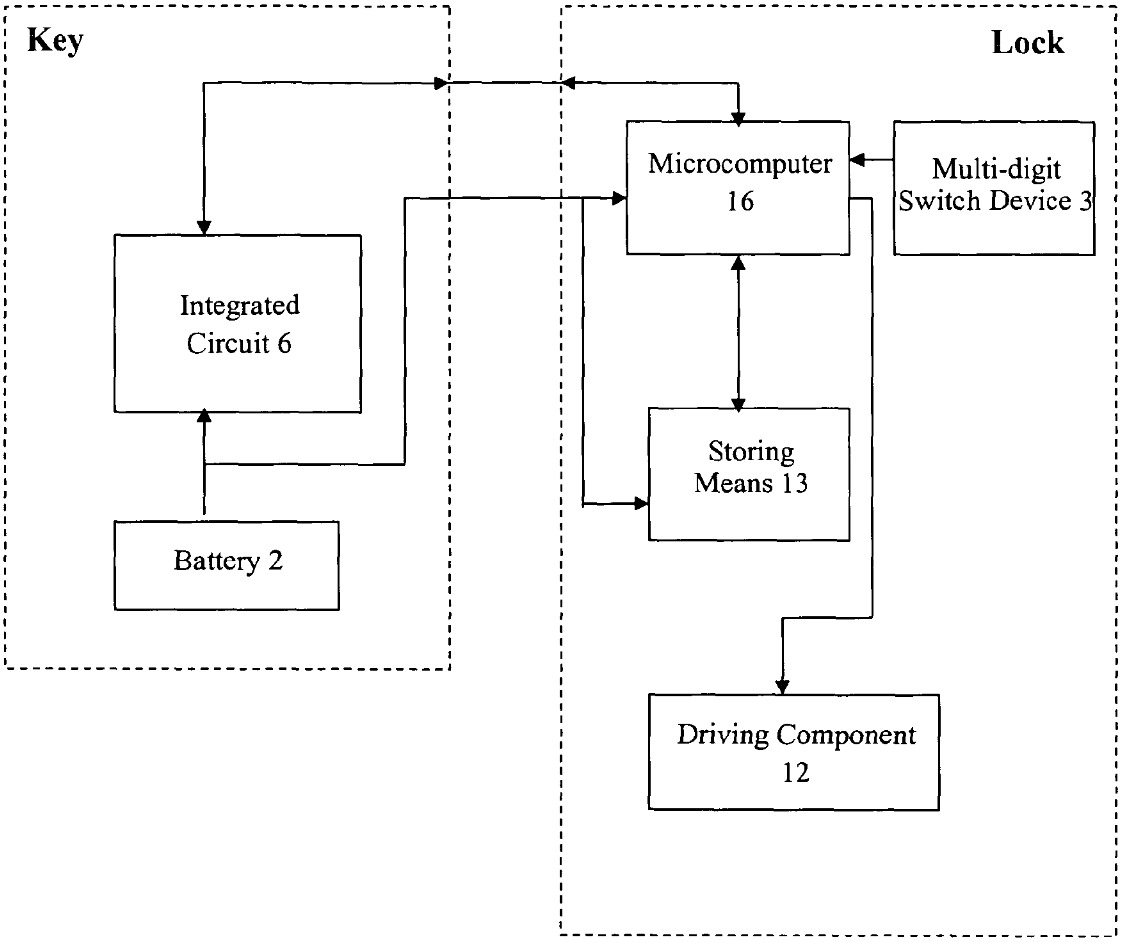
FIG. 13 is the block diagram of the electrical circuit according to a fourth embodiment of the invention.

Referring to FIG. 13, a multi-digit switch device 3 is connected with the control device 16. According to the fourth embodiment, two kinds of codes are stored previously into the microcomputer 16 or the storing means 13 of the lock when the lock is manufactured. One code is the setting code. To set the key, the user sets the data manually on the multi-digit switch device 3 to make them to be identical with the setting code previously stored in the lock. Thus the key inserted into the lock is registered into the lock unconditionally, and the key can then open the lock. The other code is the cancel code. The user may set the data manually on the multi-digit switch device 3 to make them to be identical with the cancel code previously stored in the lock. Thus the key inserted into the lock should open the lock, and all data stored in the key code memory in the lock are cleared off. The multi-digit switch device 3 is mounted on the electrical circuit board 15. According to the fourth embodiment, the multi-digit switch device 3 has binary code system on each bit (only two states OFF and ON at the binary code switch). Whatever the setting or cancel of the key is finished, the operator should set the switch randomly and keep the code in mind to prevent the code to be stolen by others.

Figure 14:
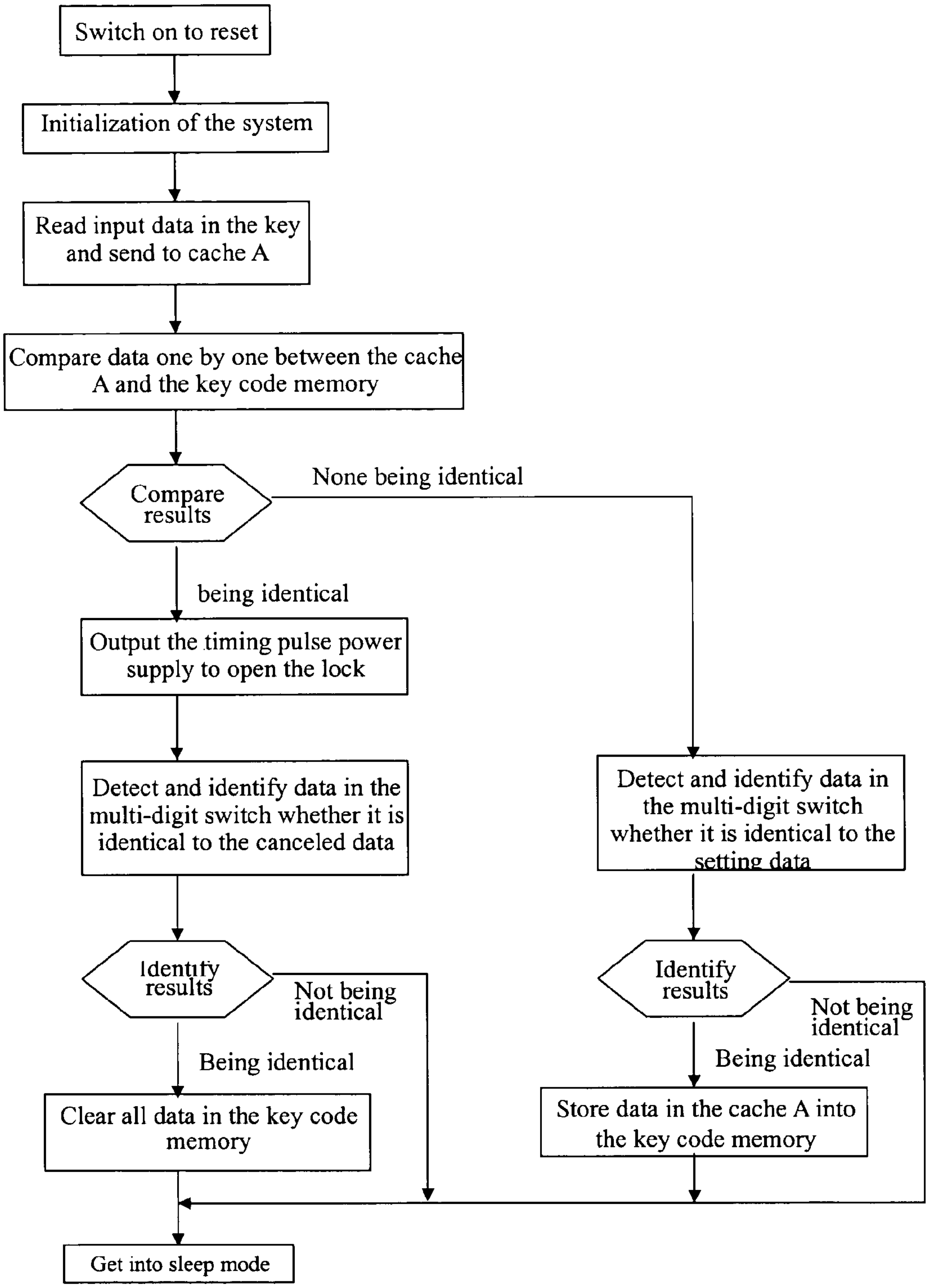
FIG. 14 is the flow chart of the control device 16 according to the fourth embodiment of the invention.

FIG. 14 is the flow chart of the control device 16 according to the fourth embodiment of the system. When the key is inserted into the lock hole 7, the system is energized and initialized. The control device 16 reads the key code inputted by the key, and stores the data into the cache A. A data comparator compares one by one between the data in the cache A and those registered data in the key code memory in the storing means 13. If one key code is identical with the data in the cache A, the timing pulse power supply to open the lock shall be outputted to drive the driving element 12 to open the lock. The detection identifier then makes detection and identification upon the data formed by the multi-digit switch device 3 to check if it is identical with the cancel code. If not identical, the system shall enter into the sleep mode. If identical, all key codes in the key code memory shall be cleared off. If none of the data in the cache A is identical with the data in the key code memory after comparison by the comparator, the detection identifier shall detect and identify the data formed by the multi-digit switch device 3 to check if it is identical with the setting code. If not identical, the system shall go into sleep mode. If identical, the date in the cache A shall be stored into the key code memory to complete setting of the key.

Therefore, the invention includes four embodiments. Depending on different habit and mentality of people to use the lock, the manufacturer can select one or several embodiments.

The invention claimed is:

1. An intelligent lock system comprising:

an electronic key including a housing (1), a battery (2), a head (5), a storing means (6), said storing means (6) including a non-volatile memory which store a special key code, and a group of contacts (4) setting on the head (5), said group of contacts including a plurality of contacts, wherein each contact is physically spaced apart and electrically insulated from other contacts; said contacts are used for power supply and data transmission, and are connected with two poles of the battery (2) and the storing means (6) by wires respectively; and an intelligent lock including a housing (8), a lock hole (7), a lock tongue (9), a latch mechanism (10), a driving mechanism (11), a driving component (12), an electrical circuit board (15), a group of contacts (17) for electrical connection with the electrical key, wherein each contact is physically spaced apart and electrically insulated from other contacts, and a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) reads a key code stored in the connected key by the group of contacts (17) and checks whether the key code stored in the connected key is identical with one of the key codes in the storing means (13), and if a result is identical, said control device (16) drives the driving component (12) to open the lock, wherein said control device (16) receives special signals and executes the setting or cancel operations of the electronic key according to the received special signals, and a connector which is used to make electrical connection between the group of contacts of at least two electronic keys and the group of contacts (17) inside the lock hole (7), said connector including a housing (19), a plug (23) which inserts into the lock hole (7), at least a first hole (20) and a second hole (21) in which key is inserted, wherein the plug (23) has a group of contacts (22), and the first hole (20) and the second hole (22) include corresponding contacts, wherein there is only one of the intelligent lock, electronic key and connector that includes a switch by which a user executes different operations and accordingly generates different special signals, and wherein when the connector is inserted into the lock hole (7), the control device (16) reads two key codes of two electronic keys inserted into the first hole (20) and the second hole (21) respectively, and when one of the key codes of keys is identical with the key code stored in the storing means (13), said control device (16) stores the key code of the other key into the storing means (13).

2. An intelligent lock system comprising:

an electronic key including a housing (1), a battery (2), a head (5), a storing means (6), said storing means (6) including a non-volatile memory which stores a special key code, and a group of contacts (4) setting on the head (5), said group of contacts including a plurality of contacts; said contacts are used for power supply and data transmission, and are connected with two poles of the battery (2) and the storing means (6) by wires respectively; and an intelligent lock including a housing (8), a lock hole (7), a lock tongue (9), a latch mechanism (10), a driving mechanism (11), a driving component (12), an electrical circuit board (15), a group of contacts (17) for electrical connection with the electrical key, and a lock hole body (18), wherein the electrical circuit board (15) is electrically connected with the driving component (12) and the group of contacts (17), said group of contacts (17) being set inside the lock hole (7) and used for power supply and data transmission, said electrical circuit board (15) including a storing means (13) for storing a plurality of key codes and a control device (16) for controlling opening of the lock and making setting or cancel operations upon the key, wherein said control device (16) reads a key code stored in the connected key by the group of contacts (17) and checks whether the key code stored in the connected key is identical with one of the key codes in the storing means (13), and if a result is identical, said control device (16) drives the driving component (12) to open the lock, wherein said control device (16) receives special signals and executes the setting or cancel operations of the electronic key according to the received special signals, a setting tool used together with an electronic key and an intelligent lock, said setting tool including a housing (25), a keyhole (26), a connecting device (28) having one plug, and an integrated circuit (24) having a memory unit, wherein the plug has a group of contacts (27) connecting with a lock hole (7) of the intelligent lock when it is inserted, and a group of contacts (27) in the keyhole (26) connecting with the connects of the plug and the integrated circuit (24) which has a preset key code of the setting tool, wherein the storing means (13) includes a special memory unit for storing the key code of the setting tool, wherein there is only one of the intelligent lock, electronic key and the setting tool that includes a switch by which a user executes different operations and accordingly generates different special signals; and wherein when the setting tool is inserted into the lock hole of the intelligent lock and there is an electronic key inserted into the keyhole (26), if the intelligent lock confirms the key code of the setting tool, the key code of the electronic key inserted into the keyhole (26) of the setting tool shall be stored into the intelligent lock.

3. The intelligent lock system according to claim 2, wherein the control device (16) reads the key code of connected setting tool by the group of contacts (17) and checks whether the key code of the setting tool is identical with the key code of stored in the special memory unit of the storing means (13), if identical, the control device (16) shall execute setting or cancel operation upon the key or upon the setting tool at the same time based on received special signal.

4. The intelligent lock system according to claim 2, wherein when the setting tool is inserted into the lock hole of the intelligent lock and there is an electronic key inserted into the keyhole (26), if the intelligent lock confirms the key code of the setting tool, depending on different special signals the control device (16) clears out the key code of the key connected with the intelligent lock or clear out all key codes of all keys.

5. The intelligent lock according to claim 3, wherein the setting operation of the setting tool is to store the key code of the setting tool inserted into the lock into the storing means (13); and the cancel operation of the setting tool is to clear out the key code of the setting tool inserted into the lock from the storing means (13).

6. The intelligent lock system according to claim 2 or 5, wherein when the setting tool is inserted into the lock hole of the intelligent lock and there is an electronic key inserted into the keyhole (26), if the storing means (13) has no key code the setting tool, the control device (16) shall store the key code of the setting tool into the special memory unit of the storing means (13).

7. A method for setting operation upon an electronic key by an intelligent lock, the electronic key having a battery and a special key code, the intelligent lock having key codes of all electronic keys which opens the lock and the key code of a setting tool, the setting tool being connected with the intelligent lock and the electronic key, said method comprising:

(1) acquiring power supply from the electronic key which is connected with the intelligent lock via a group of contacts, wherein each contact in the group is physically spaced apart and electrically insulated from other contacts;

(2) judging the key code of the setting tool if it is identical with one of key codes of the setting tool previously stored in the intelligent lock, if the key code of the setting tool is identical with the key codes of the setting tool stored in the intelligent lock, allowing setting or cancel operation upon the electronic key and upon itself;

(3) executing setting or cancel operation; and when the setting operation is executed and when the setting tool is inserted into the lock hole of the intelligent lock and there is an electronic key inserted into the keyhole (26) of the setting tool, if the intelligent lock has stored the key code of the setting tool, the key code of the electronic key which is inserted into the insert hole of the setting tool (26) shall be stored into the intelligent lock.

8. The method according to claim 7, wherein when the cancel operation is executed and when the setting tool is inserted into the lock hole of the intelligent lock and there is an electronic key inserted into the keyhole (26) of the setting tool, if the intelligent has stored the key code of the setting tool, depending on different special signals the control device (16) clears out the key code of the key connected with the intelligent lock, clears out all key codes of all keys, or clears out all key codes of all keys and the code of the setting tool.

9. The method according to claim 7, wherein when the setting tool is inserted into the lock hole of the intelligent lock and there is an electronic key inserted into the keyhole (26), if the storing means (13) has no key code the setting tool, the control device (16) shall store the key code of the setting tool into the special memory unit of the storing means (13).

10. The method according to claim 7, wherein the special signal is generated by a user from a switch of the electronic key, the intelligent lock or the setting tool.

* * * * *

UNITED STATES PATENT AND TRADEMARK OFFICE

CERTIFICATE OF CORRECTION

PATENT NO. : 7,212,099 B2

APPLICATION NO. : 10/432464
DATED : May 1, 2007
INVENTOR(S) : Zhai

It is certified that error appears in the above-identified patent and that said Letters Patent is hereby corrected as shown below:

Column 16
Line 29, delete "none data" and insert -- none of the data --
Line 38, delete "compares" and insert -- compare --
Line 40, delete "of data" and insert -- of the data --

Column 22
Line 9, delete "intelligent has" and insert -- intelligent lock has --

Signed and Sealed this

Nineteenth Day of June, 2007

JON W. DUDAS
*Director of the United States Patent and Trademark Office*